US009810799B2

(12) United States Patent
Broquet et al.

(10) Patent No.: US 9,810,799 B2
(45) Date of Patent: Nov. 7, 2017

(54) METHOD FOR AUTOMATICALLY ASSIGNING WIRELESS SEISMIC ACQUISITION UNITS TO TOPOGRAPHIC POSITIONS

(71) Applicant: SERCEL, Carquefou (FR)

(72) Inventors: Eric Broquet, Thouare sur Loire (FR); Nicolas Goloubenko, Orvault (FR); Jean-Charles Bremaud, Basse Goulaine (FR); Jean-Luc Dronet, Vigneux de Bretagne (FR)

(73) Assignee: SERCEL, Carquefou (FR)

( * ) Notice: Subject to any disclaimer, the term of this patent is extended or adjusted under 35 U.S.C. 154(b) by 420 days.

(21) Appl. No.: 14/332,025

(22) Filed: Jul. 15, 2014

(65) Prior Publication Data

US 2015/0260863 A1    Sep. 17, 2015

Related U.S. Application Data

(60) Provisional application No. 61/951,898, filed on Mar. 12, 2014, provisional application No. 61/951,882, filed on Mar. 12, 2014.

(51) Int. Cl.
*G01V 1/20* (2006.01)
*G01V 1/00* (2006.01)
(Continued)

(52) U.S. Cl.
CPC ........... *G01V 1/20* (2013.01); *G01V 1/003* (2013.01); *G01V 1/168* (2013.01); *G01V 1/223* (2013.01)

(58) Field of Classification Search
CPC .......... G01V 1/22; G01V 1/223; G01V 1/003; G01V 1/20
(Continued)

(56) References Cited

U.S. PATENT DOCUMENTS

| 5,276,655 | A | * | 1/1994 | Rialan | G01V 1/22 367/76 |
| 2002/0152053 | A1 | * | 10/2002 | Roy | G01V 1/22 702/185 |

(Continued)

OTHER PUBLICATIONS

European Search Report dated Sep. 14, 2015 for European Application No. 14175694 filed Jul. 3, 2014.
(Continued)

*Primary Examiner* — Ian J Lobo
(74) *Attorney, Agent, or Firm* — Ipsilon USA, LLP

(57) ABSTRACT

It is proposed a method for automatically assigning wireless seismic acquisition units to topographic positions, each wireless seismic acquisition unit includes a satellite navigation system receiver. The method has the following steps, carried out by an assigning device: obtaining topographic locations at which the wireless seismic acquisition units are expected to be laid; obtaining measured positions of the wireless seismic acquisition units, corresponding to or derived from position information provided by the satellite navigation system receivers when the wireless seismic acquisition units are installed on the ground, each near one of the topographic locations; and computing associations, each between one of the wireless seismic acquisition units and one of the topographic positions, as a function of a comparison between the measured positions and the topographic locations.

15 Claims, 8 Drawing Sheets

(51) Int. Cl.
   *G01V 1/22* (2006.01)
   *G01V 1/16* (2006.01)
(58) Field of Classification Search
   USPC .......................................................... 367/77
   See application file for complete search history.

(56) References Cited

U.S. PATENT DOCUMENTS

2008/0080311 A1   4/2008   Eperjesi et al.
2013/0148470 A1   6/2013   Crice et al.

OTHER PUBLICATIONS

Mexican Office Action and English Summary dated Jul. 7, 2016 for Mexican Application No. 2015/003135 filed Mar. 11, 2015.

* cited by examiner

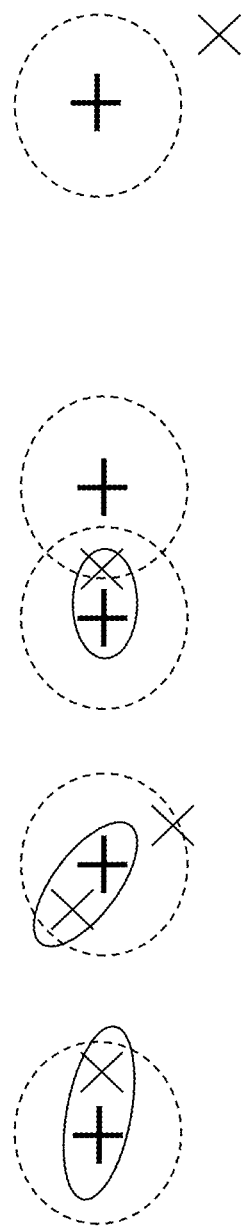

METHOD FOR AUTOMATICALLY ASSIGNING WIRELESS SEISMIC ACQUISITION UNITS TO TOPOGRAPHIC POSITIONS

1. CROSS REFERENCE TO RELATED APPLICATIONS

This application is a Non-Provisional application claiming priority to U.S. Provisional Patent Application No. 61/951,898, filed Mar. 12, 2014, and U.S. Provisional Patent Application No. 61/951,882, filed Mar. 12, 2014, the contents of which are hereby incorporated by reference in their entireties.

2. FIELD OF THE DISCLOSURE

The field of the disclosure is that of seismic data acquisition systems. To collect geophysical data, the principle of operation of these systems is as follows: for a given seismic survey, one or several seismic sources (explosives, falling weights, vibrators, air guns, etc.) are activated to propagate omnidirectional seismic wave trains; the wave trains reflected by the layers of the subsurface are detected by seismic sensors, which generate a signal characterizing the reflection of the waves on the geological interfaces of the subsurface.

More specifically, the disclosure relates to a method for automatically assigning wireless seismic acquisition units to topographic positions.

The disclosure can be applied notably to the oil prospecting industry using seismic method, but can be of interest for any other field implementing a seismic data acquisition network.

3. TECHNOLOGICAL BACKGROUND

Typically, a seismic data acquisition system comprises a network connected to a central unit.

In a first known implementation, the network comprises a plurality of wired acquisition lines. Each wired acquisition line comprises nodes and concentrators, thus all seismic data can be received in the central unit in a real-time manner. The nodes are assembled in series along a telemetry cable and are each associated with at least one seismic sensor (in general, strings of seismic sensors). These nodes process signals transmitted by the seismic sensor(s) and generate data. The concentrators are assembled in series along the telemetry cable and are each associated with at least one of the nodes. Each concentrator receives the data generated by the node(s) with which it is associated. The sensors are either analog sensors or digital sensors. When analog sensors (also referred to as "geophones") are used, they are generally interconnected by cables to form clusters referred to as "strings of geophones". One or several of these strings of geophones (in series or in parallel) are connected to each node (in this case, a node is also referred to as FDU, for "Field Digitizing Unit") and this latter performs an analog to digital conversion of the signal from the groups of geophones and send these data to the central unit. When digital sensors are used (e.g. micro-machined accelerometers, also referred to as "MEMS-based digital accelerometer"), they are integrated in the nodes (in this case, a node is also referred to as DSU, for "Digital Sensor Unit"), which eliminates the geophone strings. Each node integrates one or several digital sensors.

In a second known implementation, the network comprises wireless seismic acquisition units (also referred to as RAU, for "Remote Acquisition Units"). Each wireless seismic acquisition unit is independent and associated with (i.e. is connected to or integrates one or several functions of) one or several of aforesaid nodes. Each wireless seismic acquisition unit communicates wirelessly (directly or through one or several other wireless seismic acquisition units and/or through one or several of aforesaid concentrators) with the central unit and/or with a harvesting device (carried by an operator also referred to as "harvester") if a data harvesting strategy is implemented. The set of wireless seismic acquisition units could constitute a multi-hop wireless mesh network, allowing the wireless seismic acquisition units to exchange data, between them and with the central unit. Thus, each wireless seismic acquisition unit stores its own data (i.e. data obtained from the node(s) with which it is associated) and, eventually, also stores data received from one or several other wireless seismic acquisition units (i.e. data obtained from the node(s) associated with this or these other wireless seismic acquisition units). The sensors are either analog sensors or digital sensors. When analog sensors ("geophones") are used, each wireless seismic acquisition unit integrates for example one or a plurality of aforesaid nodes (as described for the first known implementation with geophones). When digital sensors are used, each wireless seismic acquisition unit is for example connected to a node which integrates one or several digital sensors (as described for the first known implementation with digital sensors).

In the following description, we consider the case of the second known implementation, i.e. a network comprising wireless seismic acquisition units.

In a seismic acquisition survey, the wireless seismic acquisition units are placed on the field at specific locations, known as "topographic locations". When implementing wireless seismic acquisition units, the following three steps are required (seismic data recording is starting when they are completed):

a) The topographic locations have been defined by a geologist prior to the deployment of the wireless seismic acquisition units. The topographic locations have a precise location on the field (e.g. GPS coordinates or any other GNSS coordinates), which are recorded in a specific file (also called "SPS" file, for "Shell Processing Script" file). The topographic locations are generally computed at a central unit to draw a grid on the ground, along grid lines. In real conditions, there may be thousands of topographic locations on the field. They are indicated (staked out) by surveyors, on the ground, using a marker (stake, flag, paint on the ground, etc.). FIG. 1 illustrates an example of topographic locations 1 on the ground, placed in a grid pattern comprising lines L1-L3.

b) During the seismic mission, the deployment of the wireless seismic acquisition units is performed at all marked topographic locations. In other words, each wireless seismic acquisition unit is installed on the ground, near a marked topographic location. FIG. 2 illustrates an example of wireless seismic acquisition units 2 deployed near marked topographic locations 1, along lines L1-L3.

c) Once wireless seismic acquisition units are deployed, another step is required for their identification on the field. It is necessary to know which wireless seismic acquisition unit is placed at which topographic location. This step is called "assignment step". An operator needs to walk along the lines where the wireless seismic acquisition units are placed (each line comprises an huge number of wireless seismic acquisition units, each unit being separated to another unit by a planned distance). Next, thanks to the help of an external device 4, the operator 3 records the associations each between one of the wireless seismic acquisition units 2 on the ground and one of the topographic locations 1 (which is close to this wireless seismic acquisition unit). Most of external devices use RFID technology for the identification of units, and so require many people to sweep all the wireless seismic acquisition units with RFID readers. FIG. 3 illustrates a manual assignment by an operator 3 and its external device 4, with the operator walking along a line L3 (as shown by the arrow referenced 5).

A drawback of this known operation in three steps is that walking along the lines and associating manually the wireless seismic acquisition units with their topographic locations consumes time for the human operators and needs the cost of an external device for each human operator. In other words, the known three-step operation is a huge constraint for deployment of wireless seismic acquisition units. Due to the high volume of wireless seismic acquisition units, it may take several days before starting seismic recording.

Another drawback is that the human operators may make some mistake by manually entering the associations in their external devices.

Yet another drawback is that the human operators are exposed to field hazards while walking on the survey location.

4. SUMMARY

A particular embodiment of the disclosure proposes a method for automatically assigning wireless seismic acquisition units to topographic positions, each wireless seismic acquisition unit comprising a satellite navigation system receiver. Said method comprises the following steps, carried out by an assigning device:

obtaining topographic locations at which the wireless seismic acquisition units are expected to be laid;

obtaining measured positions of the wireless seismic acquisition units, corresponding to or derived from position information provided by the satellite navigation system receivers when the wireless seismic acquisition units are installed on the ground, each near one of the topographic locations; and computing associations, each between one of the wireless seismic acquisition units and one of the topographic positions, as a function of a comparison between the measured positions and the topographic locations.

The general principle is that of taking advantage of the embedded satellite navigation system receiver (GNSS receiver, for "Global Navigation Satellite System" receiver) in wireless seismic acquisition units. This GNSS receiver is mainly used for time synchronization but it also gives either directly measured positions (GNSS positions) of the deployed wireless seismic acquisition units, or position information which can be used by the assigning device to obtain (using Differential GNSS post-processing) the measured positions (GNSS positions) of the deployed wireless seismic acquisition units. These two alternatives are detailed below. In both cases, the idea is to use the measured positions to find the topographic locations wireless seismic acquisition units have been assigned to.

Doing so, there is no need of an external device, and no need for an operator to walk along the lines. We give more efficiency to the assignment phase (compared with the known third step of the aforesaid three-step operation) by automating the association between the wireless seismic acquisition units and their topographic locations on the field. So, we save the cost of an external device and the time of manually associating the wireless seismic acquisition units with the topographic locations, on the field. In other words, no human intervention on the field is necessary to associate the units with their topographic location, saving time, errors and avoiding field hazards.

According to a particular feature, said step of computing associations is carried out using the following first rule: a given topographic position is associated to the closest wireless seismic acquisition unit, provided that a distance between said given topographic position and said closest wireless seismic acquisition unit is less than an association distance.

This first rule is very easy implement. The GNSS positions of the wireless seismic acquisition units just need standard precision since the association is done within an association distance (i.e. an association range) that can exceed the GNSS range of error.

According to a particular feature, said step of computing associations is carried out using the following second rule: if according to said first rule a given wireless seismic acquisition unit can be associated to several topographic positions, said given wireless seismic acquisition unit is associated to the closest topographic position.

This second rule ensures that each wireless seismic acquisition unit is associated to only one topographic position.

According to a particular feature, the method comprises the following step, carried out by the assigning device: graphically presenting to an operator, via a man-machine interface of said assigning device, the associations resulting from said step of computing associations.

Thus the assigning device is very easy to use by the operator.

According to a particular feature, the method comprises the following step, carried out by the assigning device: enabling the operator, via said man-machine interface, to validate or correct the associations graphically presented.

Thus the operator can easily validate or correct the associations automatically carried out by the assigning device.

According to a particular feature, the method comprises the following steps, carried out by the assigning device:

checking the associations resulting from said step of computing associations; and if at least one error is detected in the step of checking, raising an alert via a man-machine interface of said assigning device, and/or performing a correction operation.

Thus once an assignment has been made, it is possible to check it afterwards and to raise an alert and/or make some corrections. These supplemental steps can be run on the current assignment or on an assignment that has been made in the past (e.g. by reloading former events in a database of the assigning device). In other word, we can resurrect a former assignment and apply changes in former events.

According to a first check, said step of checking comprises checking if the measured position of one of the wireless seismic acquisition units is an aberrant position.

According to a second check, said step of checking comprises checking if more than one wireless seismic acquisition unit is assigned to the same topographic location.

According to a third check, said step of checking comprises checking if one of the wireless seismic acquisition units is spaced from its associated topographic location, by a distance greater than a determined threshold.

According to a fourth check, said step of checking comprises checking if, for a seismic line comprising a set of successive wireless seismic acquisition units in a determined order, the measured positions of said set of wireless seismic acquisition units are not consistent with said determined order.

According to a fifth check, said step of checking comprises checking if, for two adjacent wireless seismic acquisition units of a seismic line comprising a set of successive wireless seismic acquisition units in a determined order, the measured positions of said two adjacent wireless seismic acquisition units are not consistent with their associated topographic locations.

According to a particular feature, said assigning device is a central unit of a seismic system, or a personal computer of a mobile harvester.

According to a first particular implementation, said step of obtaining measured positions comprises: obtaining the measured positions from the wireless seismic acquisition units, said measured positions being computed by the satellite navigation system receivers of the wireless seismic acquisition units.

According to a second particular implementation, said step of obtaining measured positions comprises:
  obtaining first raw position data from the wireless seismic acquisition units, corresponding to position information provided by the satellite navigation system receivers when the wireless seismic acquisition units are installed on the ground, each near one of the topographic locations;
  obtaining second raw position data from at least one reference station, corresponding to position information provided by a satellite navigation system receiver comprised in said at least one reference station;
  computing said measured positions, as a function of said first raw position data and said second raw position data.

In another embodiment, the disclosure pertains to a computer program product comprising program code instructions for implementing the above-mentioned method (in any of its different embodiments) when said program is executed on a computer or a processor.

In another embodiment, the disclosure pertains to a non-transitory computer-readable carrier medium, storing a program which, when executed by a computer or a processor causes the computer or the processor to carry out the above-mentioned method (in any of its different embodiments).

In another embodiment, the disclosure proposes an assigning device for automatically assigning wireless seismic acquisition units to topographic positions, each wireless seismic acquisition unit comprising a satellite navigation system receiver. Said assigning device comprises:
  means for obtaining topographic locations at which the wireless seismic acquisition units are expected to be laid;
  means for obtaining measured positions of the wireless seismic acquisition units, corresponding to or derived from position information provided by the satellite navigation system receivers when the wireless seismic acquisition units are installed on the ground, each near one of the topographic locations; and
  means for computing associations, each between one of the wireless seismic acquisition units and one of the topographic positions, as a function of a comparison between the measured positions and the topographic locations.

Advantageously, the assigning device comprises means for implementing the steps it performs in the assigning method as described above, in any of its various embodiments.

5. LIST OF FIGURES

Other features and advantages of embodiments of the disclosure shall appear from the following description, given by way of an indicative and non-exhaustive examples and from the appended drawings, of which:

FIG. 1, already described with reference to the prior art, illustrates an example of topographic locations on the ground, placed in a grid pattern comprising lines (first step of the known three-step operation);

FIG. 2, already described with reference to the prior art, illustrates an example of wireless seismic acquisition units deployed near marked topographic locations, along lines (second step of the known three-step operation);

FIG. 3, already described with reference to the prior art, illustrates a manual assignment by an operator and its external device, with the operator walking along a line (third step of the known three-step operation);

FIG. 4 is a flowchart of a particular embodiment of the method according to the disclosure;

FIG. 5 provides a schematic illustration of a particular embodiment of step 42 in FIG. 4 (obtaining measured positions of the wireless seismic acquisition units);

FIGS. 6a to 6d illustrate association rules used in a particular embodiment of step 43 in FIG. 4 (computing associations between the wireless seismic acquisition units and the topographic locations);

FIG. 10 is a particular embodiment of step 42 in FIG. 4 (obtaining measured positions).

6. DETAILED DESCRIPTION

In all of the figures of the present document, identical elements and steps are designated by the same numerical reference sign.

Figure 4:
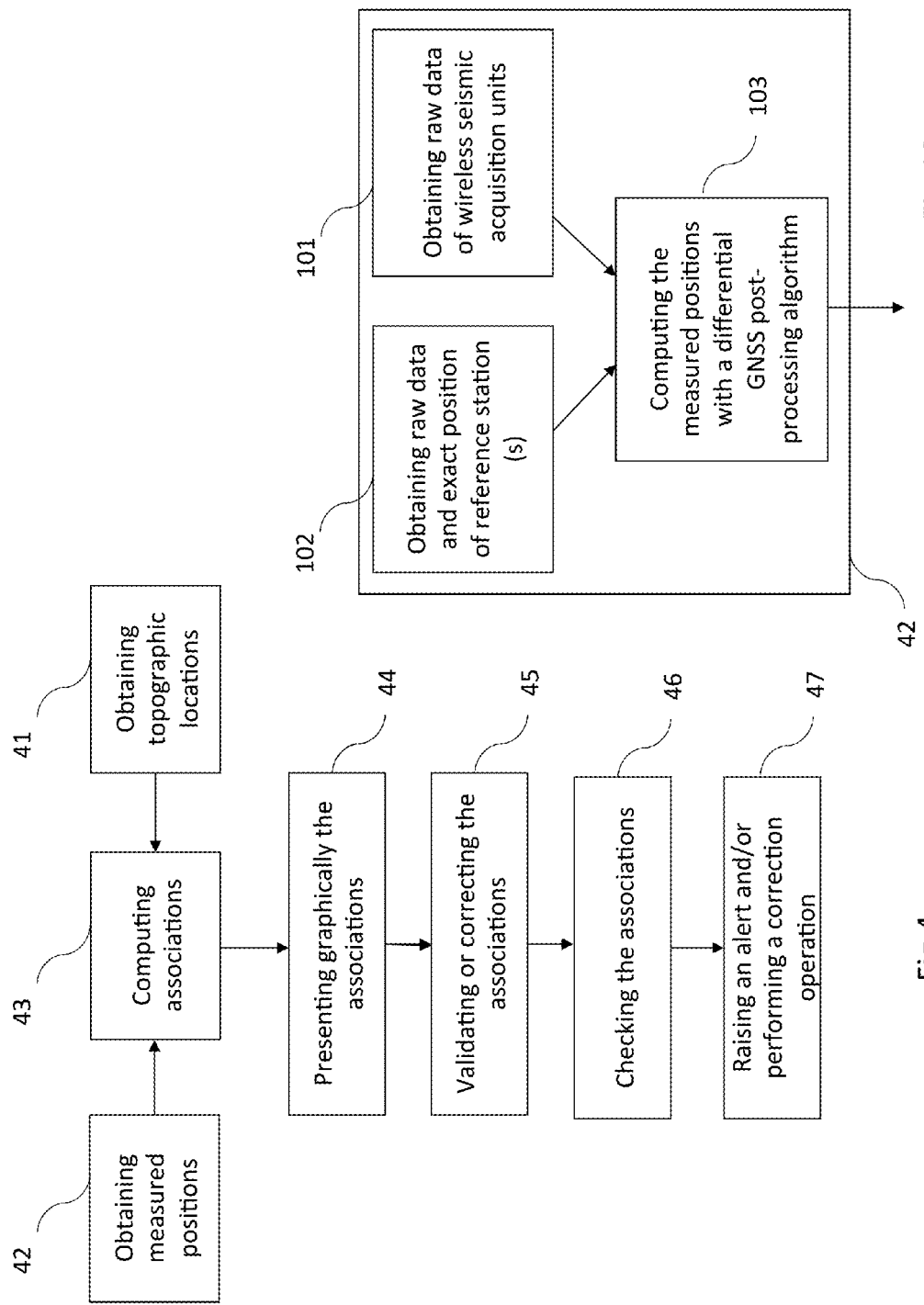

Referring now to the flowchart of FIG. 4, we present a particular embodiment of the method according to the disclosure. When executed by an assigning device (see FIG. 9 described below), this method automatically assigns wireless seismic acquisition units to topographic positions.

In step 41, the assigning device obtains topographic locations at which the wireless seismic acquisition units are expected to be laid.

Figure 1:
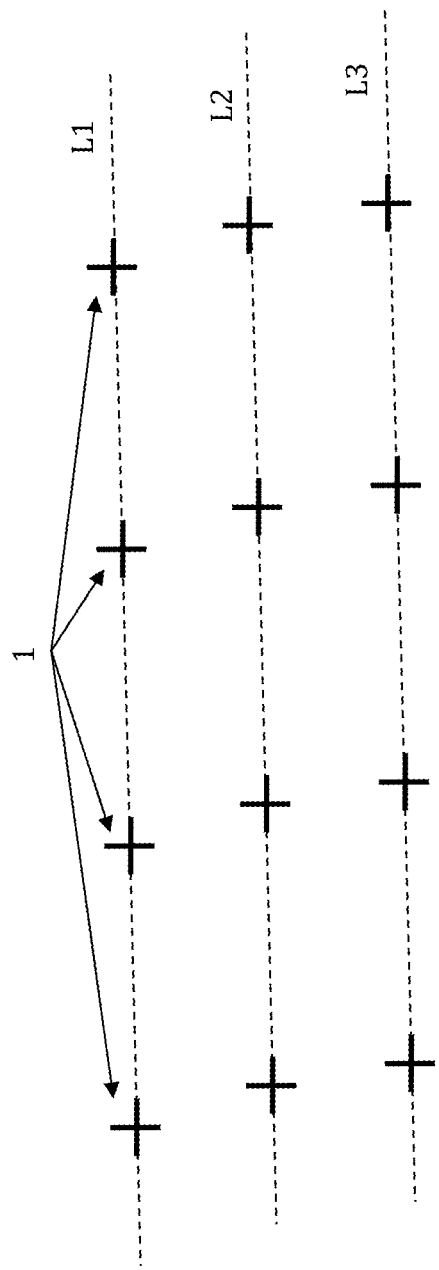

As already detailed above (see FIG. 1 and the first step of the known three-step operation), the topographic locations are defined by a geologist prior to the deployment of the wireless seismic acquisition units. The topographic locations have a precise location on the field (GNSS coordinates), which are recorded in a specific file (SPS file). In real conditions, there may be thousands of topographic locations on the field. On the ground, they are indicated (by surveyors) using a marker (stake, flag, paint on the ground, etc.).

In step 42, the assigning device obtains measured positions (GNSS positions) of the wireless seismic acquisition units. The idea is to use the GNSS receiver already embedded in the wireless seismic acquisition unit and mainly used for time synchronization. In other words, the measured positions are provided by GNSS receivers embedded in the wireless seismic acquisition units, when the wireless seismic acquisition units are installed on the ground, each near one of the topographic locations. Each wireless seismic acquisition unit comprises a GNSS receiver. GNSS receiver refers to a receiver compatible with any existing or future satellite navigation system (GPS, GALILEO, GLONASS, COMPASS, IRNSS, . . . ).

Figure 2:
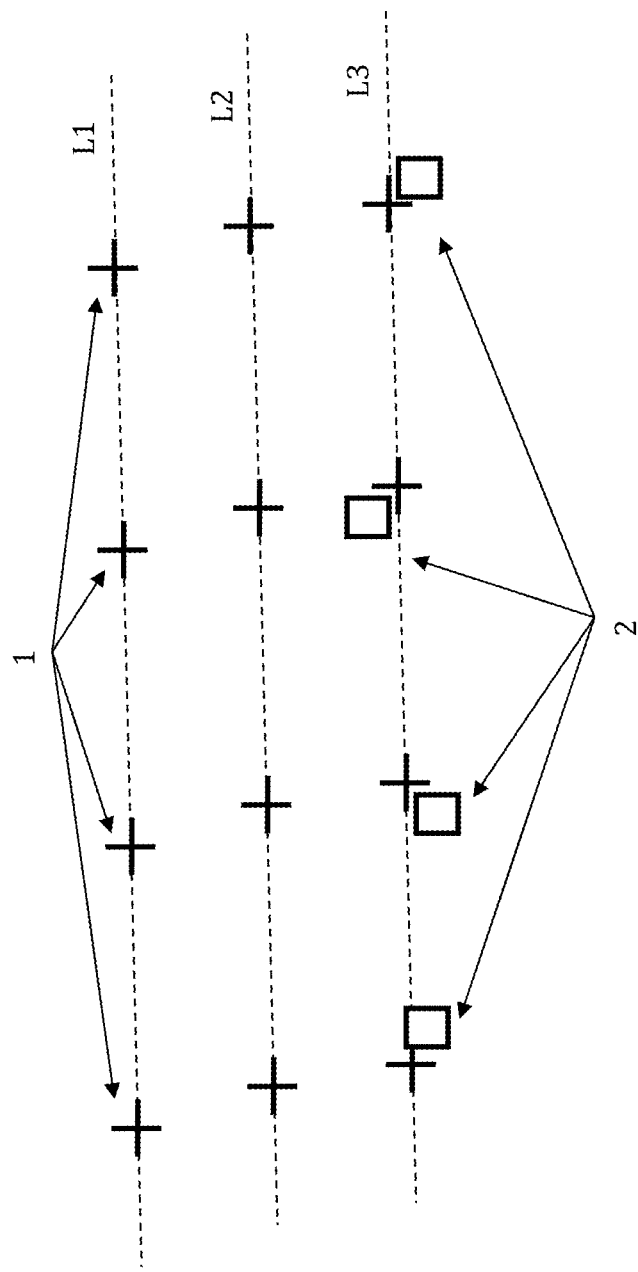
Figure 5:
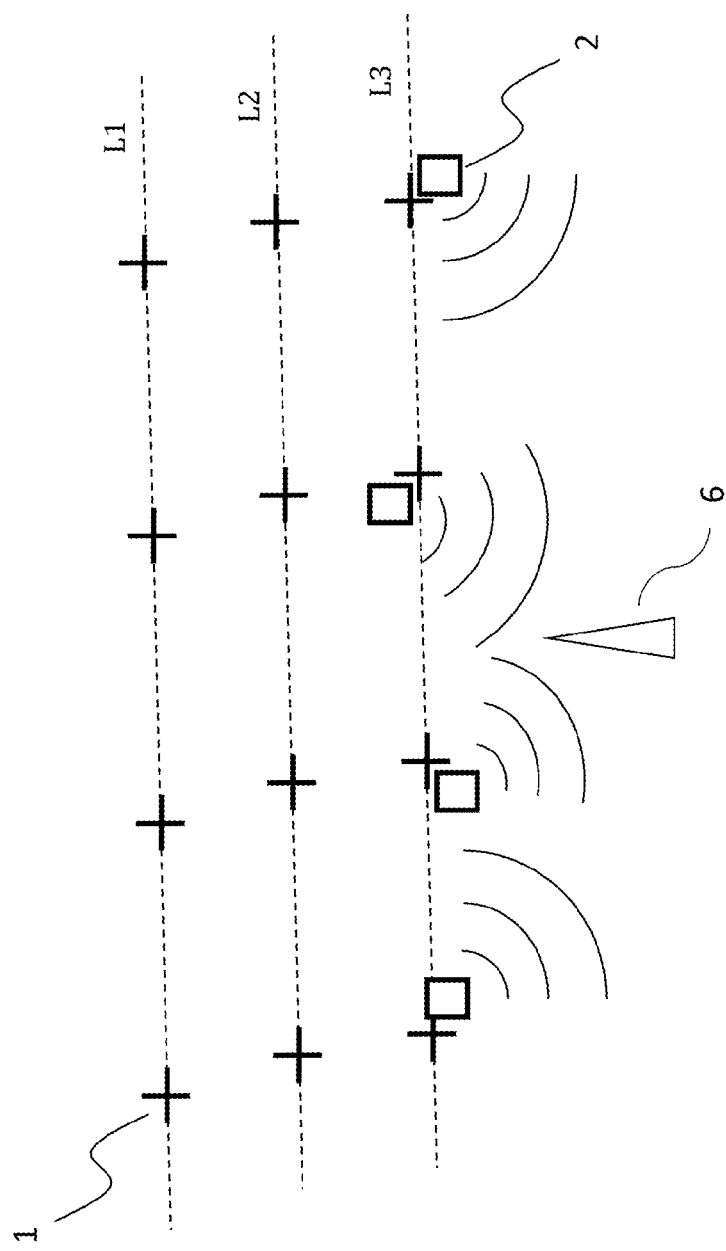

In other words, once the wireless seismic acquisition units have been deployed on the ground (i.e. after the second step of the known three-step operation, see FIG. 2), their GNSS receivers compute the GNSS positions. These GNSS positions are then retrieved, for example along with the QC (Quality Control) and SOH (State of Health, e.g. the battery level of each wireless seismic acquisition unit) information, during the QC/SOH retrieving phase. As shown in FIG. 5, this is usually done by a radio receiver 6 which may be fixed or mobile (carried by an operator or embedded on a vehicle) and which receives the GNSS positions information transmitted by means of a radio transmitter embedded in each wireless seismic acquisition unit 2.

FIG. 10 shows an alternative embodiment of step 42. Here, the measured positions (GNSS positions) are not computed directly by the GNSS receivers, and therefore not provided by the wireless seismic acquisition units. Instead, the assigning device carries out the following steps:
- step 101: obtaining first raw position data from the wireless seismic acquisition units, corresponding to position information provided by the GNSS receivers when the wireless seismic acquisition units are installed on the ground, each near one of the topographic locations;
- step 102: obtaining second raw position data from at least one GNSS reference station, corresponding to position information provided by a GNSS receiver comprised in said at least one GNSS reference station;
- step 103: computing the measured positions, as a function of the first raw position data and said second raw position data, with a differential GNSS post-processing algorithm.

In this alternative embodiment, the GNSS reference station is a static GNSS receiver whose exact position is known. This GNSS reference station may be a high end dedicated GNSS RTK ("Real Time Kinematic") receiver or the GNSS receiver from one the wireless seismic acquisition units provided that the unit position is accurately known. The distance between the reference station and all wireless seismic acquisition units shall not exceed a predetermined distance (e.g. 20 km) for best performances.

This alternative embodiment operates for example as follows: before or during seismic data recording, GNSS receivers are activated in all wireless seismic acquisition units and in the reference station(s). At the same time, the GNSS receiver of the reference station and the GNSS receivers of the wireless seismic acquisition units, track satellites from the corresponding constellation. GNSS raw data from all the aforesaid GNSS receivers (i.e. those comprised in the wireless seismic acquisition units and in the reference station(s)) are recorded. Usually GNSS raw data periodicity is 1 second, but other data rates may be configured. For each GNSS satellite, these raw data include code pseudo-range measurements, carrier-phase measurements, Doppler frequency measurements as well as navigation messages broadcast by the satellite. Once enough GNSS raw data are recorded (typically 15 minutes) data recording is stopped. GNSS raw data from the wireless seismic acquisition units and the reference station(s) are then retrieved. GNSS raw data format may be proprietary format or standard format, e.g. as RINEX/BINEX. In the assigning device (e.g. the central unit), a differential GNSS post-processing algorithm (software and/or hardware implementation) is used to compute the measured positions of all wireless seismic acquisition units, as a function of GNSS raw data from the reference station(s) and GNSS raw data from each wireless seismic acquisition unit.

A well known differential GNSS post-processing software is for example "RTKLIB" which is an Open Source Program Package for GNSS Positioning (http://www.rtklib.com). RTKLIB consists of a portable program library and several APs (application programs) utilizing the library. It supports various positioning modes with GNSS for both real-time and post-processing.

The general principle of differential GNSS positioning (real-time or post-processing) is based on the fact that positioning error is the same at a GNSS reference station and at a GNSS rover receiver (GNSS receiver moving on the field) provided the distance between them is no more than a predetermined distance (e.g. 10 km to 40 km). Accuracy is dependent on environment, raw data recording time and distance to reference station. Knowing the accurate position of the reference station, the differential GNSS positioning algorithms are able to calculate the accurate position of the GNSS rover receiver. To reach centimeter-level accuracy, the GNSS reference station and the GNSS rover receiver must be able to do simultaneously code and carrier-phase observations, generally called raw data. These observations are recorded by the GNSS reference station and the GNSS rover receiver, in order to be processed later. Post-processing allows to fix the carrier-phase ambiguity to each satellite and determine location of the GNSS rover receiver relative to the GNSS reference station with high accuracy.

In step 43, the assigning device computes associations, each between one of the wireless seismic acquisition units 2 and one of the topographic positions 1, as a function of a comparison between the measured positions (GNSS positions) and the topographic locations.

FIGS. 6*a* to 6*d* illustrate two association rules used in a particular embodiment of this step 43:
- first rule: a given topographic position is associated to the closest wireless seismic acquisition unit, provided that a distance between the given topographic position and the closest wireless seismic acquisition unit is less than an association distance;
- second rule: if according to the first rule a given wireless seismic acquisition unit can be associated to several topographic positions, the given wireless seismic acquisition unit is associated to the closest topographic position.

In the legend: the cross referenced 61 represents the measured position (GNSS position) of a wireless seismic acquisition unit; the cross referenced 62 represents a topographic location; the circle referenced 63 represents an association area, the radius of the circle representing the association distance; the ellipse referenced 64 represents a computed association between a wireless seismic acquisition unit and a topographic location.

FIG. 6a illustrates the case of a single wireless seismic acquisition unit located in the association area of a topographic location. According to the first rule, a computed association between this wireless seismic acquisition unit and this topographic location is generated.

FIG. 6b illustrates the case of two wireless seismic acquisition units located in the association area of a topographic location. According to the first rule, a computed association between one of these wireless seismic acquisition units (the closest from the topographic position) and this topographic location is generated.

FIG. 6c illustrates the case of a wireless seismic acquisition unit located in two association areas (each of a different topographic location). According to the second rule, a computed association between this wireless seismic acquisition unit and one of these topographic locations (the closest from the wireless seismic acquisition unit) is generated.

FIG. 6d illustrates the case of a single wireless seismic acquisition unit located outside the association area of a topographic location. According to the first rule, no computed association is generated.

In step 44, the assigning device graphically presents to an operator, via its man-machine interface (e.g. on a screen), the associations resulting from step 43 of computing associations.

In step 45, the assigning device enables the operator, via its man-machine interface (e.g. screen and mouse, or touch screen), to validate or correct the associations graphically presented.

In step 46, the assigning device checks the computed associations (resulting from step 43). Particular embodiments of step 46 are detailed below, in relation with FIGS. 7 and 8.

In step 47, if at least one error is detected in step 46 of checking, the assigning device raises an alert via its man-machine interface and/or performs a correction operation. For example, GNSS erroneous positions are automatically detected and highlighted, and the operator (observer) can take appropriate corrective decisions (e.g. manually associate the wireless seismic acquisition unit to a topographic location or send someone on the field to associate the wireless seismic acquisition unit with a topographic location).

Thus once an assignment has been made, it is possible to check it afterwards and to raise an alert and/or make some corrections. It must be noted that steps 46 and 47 can be carried out immediately after steps 41 to 45, or later. In other words, steps 46 and 47 can be run on an assignment (resulting from steps 41 to 45) that has been made in the past (e.g. by reloading former events in a database of the assigning device). This allows to resurrect a former assignment and apply changes in former events.

Figure 3:
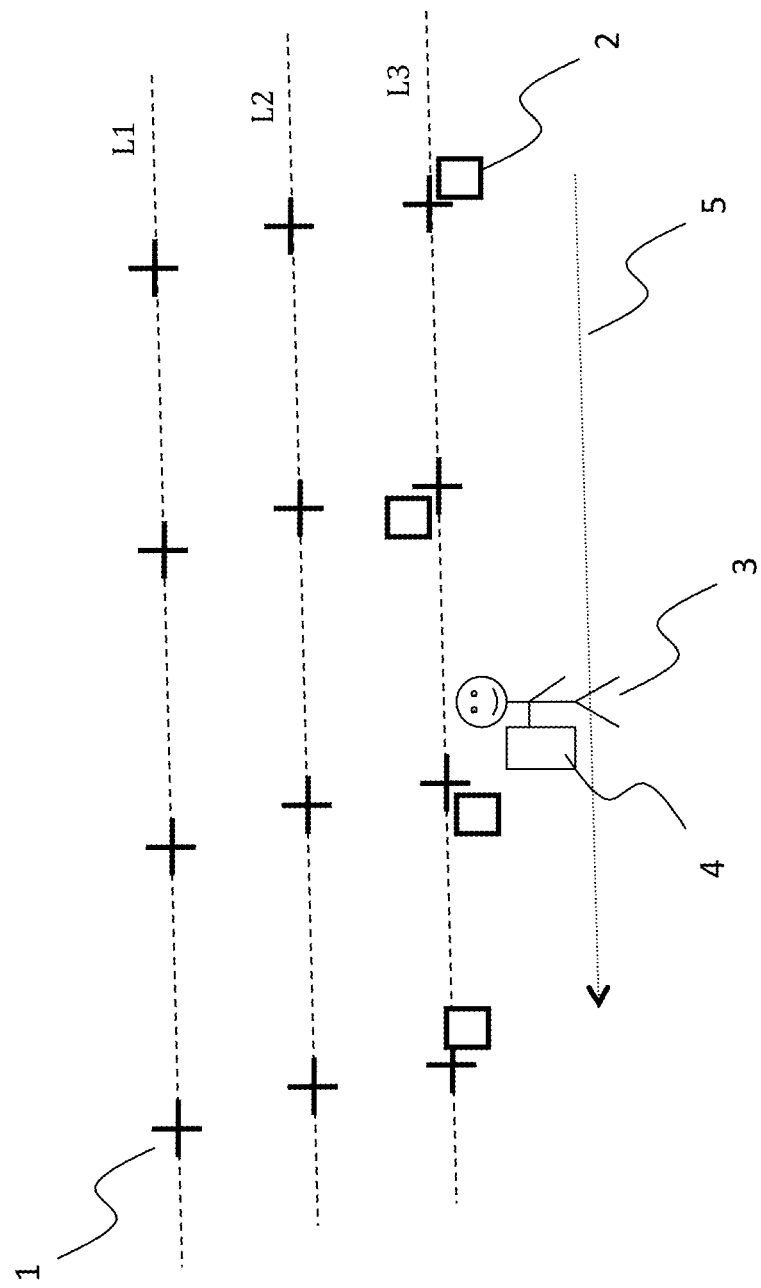

In an alternative embodiment, steps 46 and 47 are carried out on an assignment resulting from any prior art technique (e.g. the known three-step operation described above, in relation with FIGS. 1 to 3).

We detail now particular embodiments of the checking step 46 in FIG. 4 (also referred to as "geometry check").

Examples of Checks without Using the Topographic Locations (i.e. without Using the SPS File)

1) Check if a Wireless Seismic Acquisition Unit is Far from Prospect

The assigning device checks if the measured position (GNSS position) of one of the wireless seismic acquisition units is an aberrant position. This may be indicative of an invalid GNSS position.

The following algorithm is performed:

for each wireless seismic acquisition unit, projecting its GNSS positions, i.e. its latitude and longitude, in a planar coordinate system (according to the same projection model for all wireless seismic acquisition units). The result is a couple of planar coordinates x and y;

computing the average of the x ($E_x$, expected value of x) and the average of the y ($E_y$, expected value of y), over all x,y of all wireless seismic acquisition units;

computing sigma$_x$, the average of the deviations from $E_x$, and sigma$_y$, the average of the deviations from $E_y$, over all x,y of all wireless seismic acquisition units;

for each wireless seismic acquisition unit:
testing if the following first condition is satisfied: the x coordinate is comprised between $E_x$–3 sigma$_x$ and $E_x$+3 sigma$_x$;
testing if the following second condition is satisfied: the y coordinate is comprised between $E_y$–3 sigma$_y$ and $E_y$+3 sigma$_y$;
if one of the first and second conditions is not satisfied, the wireless seismic acquisition unit is reported as "far from prospect".

The purpose of this test is to find aberrant positions, based on the relative positions of wireless seismic acquisition units and on the 3-sigma rule (normally applicable in the case of a Gaussian distribution). Although in the case of a seismic prospect a Gaussian distribution is not relevant, field trials revealed that the 3-sigma rule makes it possible to discard a reasonable amount of erroneous points.

2) Check if More than 1 Node is Assigned to the Same Stake

The assigning device checks if more than one wireless seismic acquisition unit is assigned to the same topographic location.

3) Check Wrong Line Order

The assigning device checks if, for a seismic line comprising a set of successive wireless seismic acquisition units in a determined order, the measured positions of this set of wireless seismic acquisition units are not consistent with the determined order.

Figure 7:
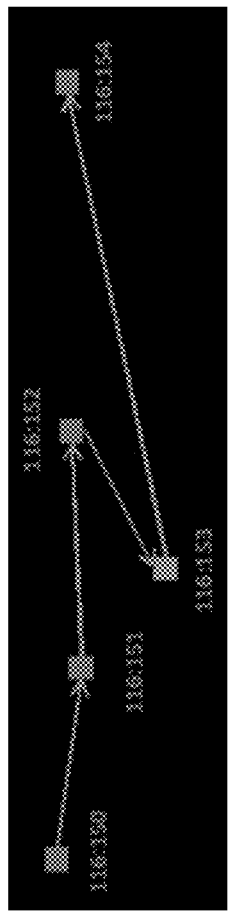
FIG. 7 illustrates a first example of error detected in step 46 in FIG. 4 (checking the computed associations)

In other words, this alert is raised if the GNSS positions of the wireless seismic acquisition units in a same line do not progress in the same direction, as in the example of FIG. 7. In this example, "116:153" is the identifier of a stake marking a topographic location. This identifier means that the associated wireless seismic acquisition unit is of the wireless seismic acquisition unit assigned to stake "116:153" does not progress in the expected line order (the position goes "backwards" relative to the others).

This problem may be indicative of a wrong wireless seismic acquisition unit position or a wireless seismic acquisition unit assigned to the wrong stake on the line.

The following mathematical checks are performed, for each wireless seismic acquisition unit assigned to the same line, in increasing stake order (assuming Unit1 is a wireless seismic acquisition unit, Unit2 is the next one in increasing stake order, Unit3 is the next one):

computing U, the vector linking the measure positions (GNSS positions) of Unit1 and Unit2 (from Unit1 to Unit2), computing V, the vector linking the measure positions (GNSS positions) of Unit2 and Unit3 (from Unit2 to Unit3), and reporting Unit3 in "Wrong line order", if the scalar product U.V is negative.

Examples of Checks Using the Topographic Locations (i.e. Using the SPS File)

1') Check if the Node is Far from Prospect
Same as check 1) above.

2') Check if More than 1 Node is Assigned to the Same Stake
Same as Check 2) Above.

3') Check if the Node is Far from its Associated Stake
The assigning device checks if one of the wireless seismic acquisition units is spaced from its associated topographic location, by a distance greater than a determined threshold.

4') Check Wrong Line Order (Enhanced Version Compared to Check 3) Above)
The assigning device checks if, for two adjacent wireless seismic acquisition units of a seismic line comprising a set of successive wireless seismic acquisition units in a determined order, the measured positions of these two adjacent wireless seismic acquisition units are not consistent with their associated topographic locations.

In other words, the GNSS positions do not match stakes (marking topographic positions) in the lines. This problem may be indicative of a wireless seismic acquisition unit assigned to a wrong stake (i.e. to a wrong topographic location) or wireless seismic acquisition unit marking performed in reverse line number order.

Figure 8:
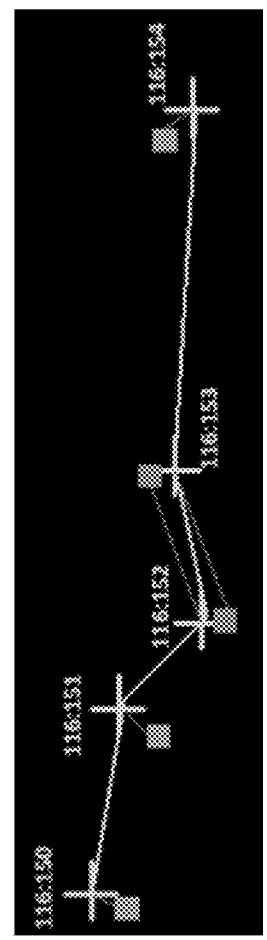
FIG. 8 illustrates a second example of error detected in step 46 in FIG. 4 (checking the computed associations)

In the example of FIG. 8, the wireless seismic acquisition units assigned to the stakes 116:152 and 116:153 have been "swapped" (the vector direction between those stakes is inverted compared to the vector direction between the two wireless seismic acquisition units).

The following mathematical checks are performed, for each stake which has a wireless seismic acquisition unit assigned to it in the line, in increasing point order:
Rec1 is a stake, Rec2 is the next stake, in increasing stake order,
Unit1 is the wireless seismic acquisition unit assigned to Rec1, Unit2 is the wireless seismic acquisition unit assigned to Rec2,
computing U, the vector linking the topographic locations of Rec1 and Rec2 (from Red to Rec2),
computing V, the vector linking the measure positions (GNSS positions) of Unit1 and Unit2 (from Unit1 to Unit2), and
reporting Unit1 and Unit2 in "wrong line order", if the scalar product U.V is negative.

Figure 9:
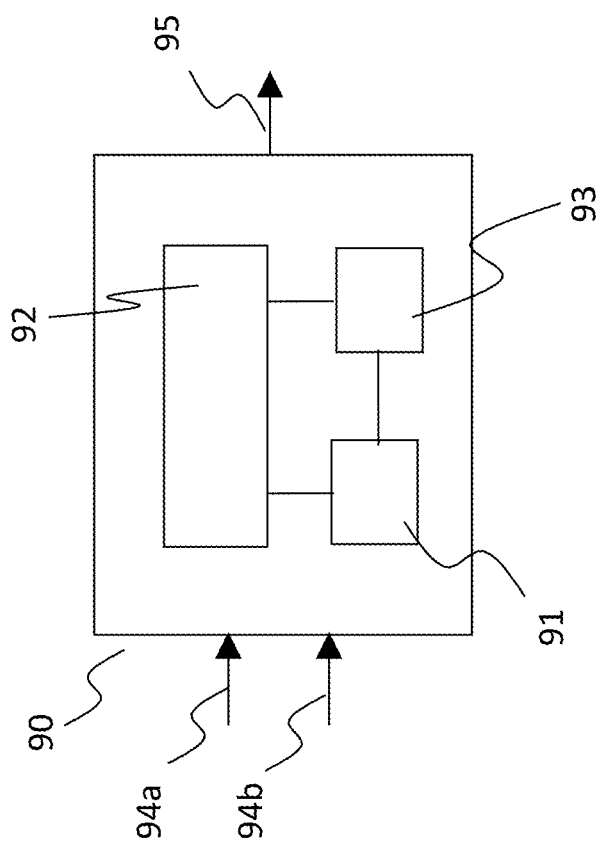
FIG. 9 shows the simplified structure of an assigning device according to a particular embodiment of the disclosure.

FIG. 9 shows the simplified structure of an assigning device 90 according to a particular embodiment of the disclosure. The assigning device is for example a central unit of a seismic system, or a personal computer of a mobile harvester.

The assigning device 90 comprises a non-volatile memory 91 (e.g. a read-only memory (ROM) or a hard disk), a volatile memory 93 (e.g. a random access memory or RAM) and a processor 92. The non-volatile memory 91 is a non-transitory computer-readable carrier medium. It stores executable program code instructions, which are executed by the processor 92 in order to enable implementation of the method described above (method for automatically assigning wireless seismic acquisition units with topographic locations), in relation with FIGS. 4 to 8.

The assigning device 90 receives (obtains) topographic locations 94*a* (see step 41 in FIG. 4) and measured positions (GNSS positions) 94*b* of the wireless seismic acquisition units (see step 42 in FIG. 4). It generates associations 95, each between one of the wireless seismic acquisition units and one of the topographic positions.

Upon initialization, the aforementioned program code instructions are transferred from the non-volatile memory 91 to the volatile memory 93 so as to be executed by the processor 92. The volatile memory 93 likewise includes registers for storing the variables and parameters required for this execution.

All the steps of the above assignment method can be implemented equally well:
by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it can also be implemented in hardware form or any form combining a hardware portion and a software portion.

At least one exemplary embodiment of the disclosure provides a technique for assigning wireless seismic acquisition units to topographic positions, this technique simplifying the "assignment step" (compared with the step c) of the known three-step operation described above).

At least one embodiment of the disclosure provides a technique of this kind, not requiring human intervention on the field (nor external device a fortiori) and thus saving time, errors and avoiding field hazards.

At least one embodiment of the disclosure provides a technique of this kind, allows the reduction of cost, and/or reducing deployment time of the wireless seismic acquisition units.

Although the present disclosure has been described with reference to one or more examples, workers skilled in the art will recognize that changes may be made in form and detail without departing from the scope of the disclosure and/or the appended claims.

The invention claimed is:

1. A method comprising:
automatically associating wireless seismic acquisition units to topographic locations, each wireless seismic acquisition unit comprising a satellite navigation system receiver, wherein automatically associating comprises the following steps, carried out by an associating device:
obtaining topographic locations at which respective ones of the wireless seismic acquisition units are expected to be laid, the topographic locations being defined prior to deployment of the wireless seismic acquisition units at the respective topographic locations and stored in a topographic location file on at least one non-transitory computer-readable medium;
obtaining measured positions of the wireless seismic acquisition units, corresponding to or derived from position information provided by the satellite navigation system receivers when the wireless seismic acquisition units are installed on the ground, each near one of the topographic locations;
computing associations, each association between one of the wireless seismic acquisition units and a respective one of the topographic locations, said associations based on a function of a comparison between the measured positions of said wireless seismic acquisition units and the topographic locations at which respective ones of the wireless seismic acquisition units are expected to be laid using at least one predetermined rule of association, where, for each seismic acquisition unit, if said wireless seismic acquisition unit meets said at least one predetermined rule of association, said seismic acquisition unit is associated with its respective one of the topographic locations, wherein said at least one predetermined rule includes the following first rule: a given topographic location is associated to the closest wireless seismic acquisition unit, provided that a distance between said given topographic location and a measured position of said closest wireless seismic acquisition unit is less than an association distance, outputting the associations for each wireless seismic acquisition unit and their respective one of the topographic locations to a database stored on the at least one non-transitory computer-readable medium; and wherein the method further comprises generating a display on a man-machine interface based on the outputted associations.

2. The method according to claim 1, wherein said step of computing associations is carried out using the following second rule: if according to said first rule a given wireless seismic acquisition unit can be associated to several topographic locations, said given wireless seismic acquisition unit is associated to the closest topographic location.

3. The method according to claim 1 wherein generating a display comprises the following step, carried out by the associating device:

graphically presenting to an operator, via the man-machine interface of said assigning device, the associations resulting from said step of computing associations.

4. The method according to claim 3, comprising the following step, carried out by the associating device:

enabling the operator, via said man-machine interface, to validate or correct the associations graphically presented.

5. The method according to claim 1, comprising the following steps, carried out by the assigning device:

checking the associations resulting from said step of computing associations; and if at least one error is detected in the step of checking, raising an alert via a man-machine interface of said associating device, and/or performing a correction operation.

6. The method according to claim 5, wherein said step of checking comprises checking if the measured position of one of the wireless seismic acquisition units is an aberrant position.

7. The method according to claim 5, wherein said step of checking comprises checking if more than one wireless seismic acquisition unit is associated to the same topographic location.

8. The method according to claim 5, wherein said step of checking comprises checking if one of the wireless seismic acquisition units is spaced from its associated topographic location, by a distance greater than a determined threshold.

9. The method according to claim 5, wherein said step of checking comprises checking if, for a seismic line comprising a set of successive wireless seismic acquisition units in a determined order, the measured positions of said set of wireless seismic acquisition units are not consistent with said determined order.

10. The method according to claim 5, wherein said step of checking comprises checking if, for two adjacent wireless seismic acquisition units of a seismic line comprising a set of successive wireless seismic acquisition units in a determined order, the measured positions of said two adjacent wireless seismic acquisition units are not consistent with their associated topographic locations.

11. The method according to claim 1, wherein said associating device is a central unit of a seismic system, or a personal computer of a mobile harvester.

12. The method according to claim 1, wherein said step of obtaining measured positions comprises:

obtaining the measured positions from the wireless seismic acquisition units, said measured positions being computed by the satellite navigation system receivers of the wireless seismic acquisition units.

13. The method according to claim 1, wherein said step of obtaining measured positions comprises:

obtaining first raw position data from the wireless seismic acquisition units, corresponding to position information provided by the satellite navigation system receivers when the wireless seismic acquisition units are installed on the ground, each near one of the topographic locations;

obtaining second raw position data from at least one reference station, corresponding to position information provided by a satellite navigation system receiver comprised in said at least one reference station, wherein the topographic location of the at least one reference station is known by the assigning device; and computing said measured positions, as a function of said first raw position data and said second raw position data.

14. A non-transitory computer-readable carrier medium storing a set of instructions that may be run by a computer in order to implement a method of automatically associating wireless seismic acquisition units to topographic locations, each wireless seismic acquisition unit comprising a satellite navigation system receiver, said method comprising the following steps, carried out by an associating device:

obtaining topographic locations at which respective ones of the wireless seismic acquisition units are expected to be laid, the topographic locations being defined prior to deployment of the wireless seismic acquisition units at the respective topographic locations and stored in a topographic location file on at least one non-transitory computer-readable medium;

obtaining measured positions of the wireless seismic acquisition units, corresponding to or derived from position information provided by the satellite navigation system receivers when the wireless seismic acquisition units are installed on the ground, each near one of the topographic locations;

computing associations, each association between one of the wireless seismic acquisition units and a respective one of the topographic locations, said associations based on a function of a comparison between the measured positions of said wireless seismic acquisition units and the topographic locations at which respective ones of the wireless seismic acquisition units are expected to be laid at least one predetermined rule of association, where, for each seismic acquisition unit, if said wireless seismic acquisition unit meets said at least one predetermined rule of association, said seismic acquisition unit is associated with its respective one of the topographic locations, wherein said at least one predetermined rule includes the following first rule: a given topographic location is associated to the closest wireless seismic acquisition unit, provided that a distance between said given topographic location and a measured position of said closest wireless seismic acquisition unit is less than an association distance, outputting the association for each wireless seismic acquisition unit and the respective one of the topographic locations to a database stored on the at least one non-transitory computer-readable medium; and wherein said method further comprising generating a display on a man-machine interface based on the outputted associations.

15. An assigning device for automatically associating wireless seismic acquisition units to topographic locations, each wireless seismic acquisition unit comprising a satellite navigation system receiver, wherein said associating device comprises:

at least one non-transitory computer-readable medium;

means for obtaining topographic locations at which respective ones of the wireless seismic acquisition units are expected to be laid; the topographic locations being defined prior to deployment of the wireless seismic acquisition units at the respective topographic locations and stored in a topographic location file on the at least one non-transitory computer-readable medium;

means for obtaining measured positions of the wireless seismic acquisition units, corresponding to or derived from position information provided by the satellite navigation system receivers when the wireless seismic acquisition units are installed on the ground, each near one of the topographic locations;

means for computing associations, each association between one of the wireless seismic acquisition units and a respective one of the topographic locations, said associations based on a function of a comparison between the measured positions of said wireless seismic acquisition units and the topographic locations at which respective ones of the wireless seismic acquisition units are expected to be laid at least one predetermined rule of association, where, for each seismic acquisition unit, if said wireless seismic acquisition unit meets said at least one predetermined rule of association, said seismic acquisition unit is associated with its respective one of the topographic locations, wherein said at least one predetermined rule includes the following first rule: a given topographic location is associated to the closest wireless seismic acquisition unit, provided that a distance between said given topographic location and a measured position of said closest wireless seismic acquisition unit is less than an association distance, outputting the association for each wireless seismic acquisition unit and the respective one of the topographic locations to a database stored on the at least one non-transitory computer-readable medium; and said associating device further comprising a man-machine interface, which presents a display based on the outputted associations.

* * * * *